US009712680B2

(12) United States Patent
Gray

(10) Patent No.: US 9,712,680 B2
(45) Date of Patent: Jul. 18, 2017

(54) APPARATUS AND METHOD FOR CATEGORIZING VOICEMAIL

(71) Applicant: Tom Gray, Ottawa (CA)

(72) Inventor: Tom Gray, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 14/285,277

(22) Filed: May 22, 2014

(65) Prior Publication Data

US 2015/0341497 A1 Nov. 26, 2015
US 2017/0171390 A9 Jun. 15, 2017

Related U.S. Application Data

(63) Continuation-in-part of application No. 14/277,157, filed on May 14, 2014, now Pat. No. 9,288,327.

(51) Int. Cl.
| | |
|---|---|
| *H04M 3/533* | (2006.01) |
| *H04M 1/64* | (2006.01) |
| *G10L 15/26* | (2006.01) |
| *G06F 17/27* | (2006.01) |

(52) U.S. Cl.
CPC ...... *H04M 3/5335* (2013.01); *G06F 17/2785* (2013.01); *G10L 15/265* (2013.01); *H04M 1/642* (2013.01); *H04M 3/533* (2013.01); *H04M 2201/40* (2013.01); *H04M 2203/552* (2013.01); *H04M 2203/558* (2013.01)

(58) Field of Classification Search
CPC .... H04L 12/58; H04W 88/023; H04W 88/184
USPC ................................. 455/413, 414.4, 415
See application file for complete search history.

(56) References Cited

U.S. PATENT DOCUMENTS

| | | | |
|---|---|---|---|
| 7,937,364 B1* | 5/2011 | Chandrasekaran et al. .. | 707/636 |
| 8,340,262 B1 | 12/2012 | Cermak et al. | |
| 2003/0098893 A1* | 5/2003 | Makinen ........................ | 345/853 |
| 2003/0157968 A1* | 8/2003 | Boman et al. ................. | 455/563 |
| 2005/0069095 A1* | 3/2005 | Fellenstein et al. ........ | 379/88.02 |
| 2006/0067502 A1* | 3/2006 | Bamrah et al. ........... | 379/211.02 |
| 2006/0111058 A1* | 5/2006 | Grant et al. ............... | 455/127.1 |
| 2007/0044539 A1* | 3/2007 | Sabol ..................... | G06Q 10/06 73/19.01 |
| 2007/0232292 A1* | 10/2007 | Larocca ................ | H04L 12/185 455/425 |
| 2009/0061827 A1* | 3/2009 | Bulgin ................ | H04M 1/6505 455/413 |
| 2009/0161994 A1* | 6/2009 | Sauerwein, Jr. .. | G06F 17/30817 382/313 |
| 2011/0184721 A1 | 7/2011 | Subramanian et al. | |
| 2011/0314048 A1* | 12/2011 | Ickman et al. ................ | 707/769 |

(Continued)

*Primary Examiner* — Matthew Sams

(57) ABSTRACT

The present disclosure relates to voicemail categorization and access. An apparatus, for example a PBX, is provided for categorizing voicemails. The apparatus is configured to store voicemail messages and to determine and store metadata associated with the voicemail messages. The apparatus allows searches of the stored voicemail messages to be performed using the associated metadata. A user interface may reside on a user device or be provided by the apparatus. The interface allows other user to search for voicemails using the metadata associated with them and subsequently displays information about the voicemails which match the search criteria.

16 Claims, 3 Drawing Sheets

(56) References Cited

U.S. PATENT DOCUMENTS

| | | | |
|---|---|---|---|
| 2012/0099718 A1* | 4/2012 | Langos | G06Q 30/0255 379/201.01 |
| 2012/0149405 A1* | 6/2012 | Bhat | 455/466 |
| 2013/0016819 A1 | 1/2013 | Cheethirala | |
| 2013/0063256 A1* | 3/2013 | Tartz | G06F 3/005 340/407.1 |
| 2013/0262564 A1* | 10/2013 | Wall et al. | 709/203 |
| 2014/0310360 A1* | 10/2014 | Song et al. | 709/206 |

* cited by examiner

APPARATUS AND METHOD FOR CATEGORIZING VOICEMAIL

CROSS REFERENCE

This application is a continuation-in-part of and claims priority from U.S. patent application Ser. No. 14/277,157 filed on May 14, 2014.

FIELD

The present invention relates to an apparatus configured to categorise voicemail messages for improved access and optionally to transcribe voicemail messages.

BACKGROUND

Many organisations and individuals receive a large volume of telephone calls in the course of a business day. Frequently these calls cannot be answered and are routed to the voicemail of the called party. It can be very time consuming for a user to go through their voicemails in an attempt to find a particular message or to determine which messages are the most urgent and important. It may be even more difficult and time consuming for another user, such as another member of the user's organisation, to find a particular voicemail message. Although some information about each message may be available to the user, such as the name of the caller if the caller is known to the user, there is scope for a much improved system of categorizing and accessing voicemail messages.

BRIEF DESCRIPTIONS OF DRAWINGS

Embodiments will now be described, by way of example only, with reference to the accompanying drawings, in which.

DETAILED DESCRIPTION

Figure 1:
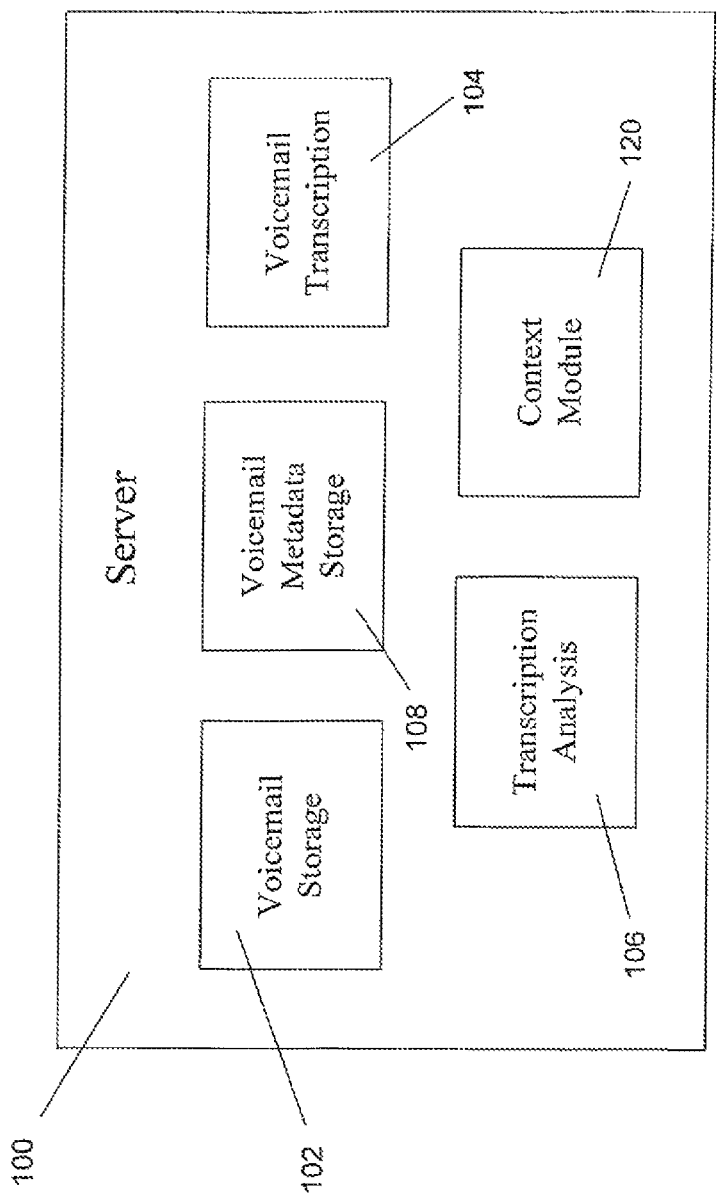
FIG. 1 is a schematic illustration of an exemplary server suitable for implementing the invention.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

FIG. 1 shows an example embodiment of a server system 100 for categorizing voicemail messages and extracting or determining metadata associated with voicemail messages.

The server system 100 may for example be a Private Branch Exchange (PBX) server, an internet protocol (IP) call server, or another type of server configured to receive and route telephonic information. The server system 100 may be embodied in a single apparatus or may be distributed across a number of different apparatus. Although not shown in the Figures, the server includes at least one processor and at least one electronic memory operatively coupled to the at least one processor for controlling operation of the server. The server also includes a number of other components which allow the server to communicate with external apparatus and to control its internal functions. These are not shown to avoid obscuring the invention.

The server 100 comprises a voicemail module 102, a voicemail transcription module 104, a transcription analysis module 106, a voicemail metadata storage module 108 and a context module 120. In some embodiments, the voicemail transcription module 104 and transcription analysis module 106 may be omitted.

The context module 120 is configured to store or have access to information about the users of the server 100. In particular, the context module 120 may access information about a particular called user. For example the information may include user's current presence and location and the user's schedule/calendar as well as the user's communication preferences. The context module 120 may also be provided with a caller ID of the calling party and may store or have access to a list of contacts of the called user with which the caller ID can be compared. The called user may be a member of one or more collaborative groups within their organization. The context module may also have access to the details of various collaborative groups allowing for improved call context determination and subsequent voicemail categorization. The context module 120 is configured to use identity information of the called user and/or identity information of the calling user to determine one or more collaborative groups that are relevant to the voicemail message. The context module may access information about a called user as soon as the call is received at the server 100, during a voicemail recording or after the voicemail message has been recorded.

The voicemail module 102 represents the user's voicemail application and voicemail message storage. The voicemail module 102 may be configured to answer calls routed to it, play messages to the caller and to record voicemail messages. The voicemail transcription module 104 comprises a speech analysis program which listens to voicemail messages as they are being recorded in the voicemail module 102 and/or after they have been recorded and produces a written transcription of the message. In some embodiments, the transcription is produced in real time or near real time. Although the voicemail transcription module 104 is shown as a separate module, it may in some embodiments be integrated into the voicemail module 102 as a single "voicemail and voicemail transcription application".

The transcription analysis module 106 is configured to access the transcription produced by the voicemail transcription module 104 and to analyse it in order to determine information about the call and/or caller. The transcription analysis module 106 may comprise a database of words and phrases and a number of rules linking certain words/phrases to conclusions regarding the context of the call and/or information about the caller. For example, phrases such as 'close my account', 'see everything', 'cancel my order' etc. from an external customer can indicate a customer retention issue. Words such as 'disappointed', 'unacceptable' etc. can indicate that the caller is particularly unhappy. As the transcription analysis module 106 is configured to postulate a context of the call based on the voicemail transcription, it may be integrated with the context module 120 into a single application. The voicemail transcription analysis may allow an appropriate collaborative group to be identified where it could not be identified before.

The voicemail metadata storage module 108 is configured to generate and/or store metadata associated with the stored voicemails. The metadata may be the information obtained by the context module. Alternatively or in addition, the metadata may be related to the information obtained by the context module. The metadata may also be or be related to the information obtained by the transcription analysis module 106. The stored voicemail messages are categorized by the metadata stored in association with them.

Exemplary operation of the system 100 will now be described. The server 100 is configured to receive and handle telephonic communication such as phone calls. When a called user is unavailable or unwilling to take a call, for example because they are on another call, away or have indicated that they should not be disturbed, then the incoming call is routed to the user's voicemail 102. A selection module (described in detail with respect to FIG. 2) may decide how to route the call. The selection module may consult the context module 120 in making the routing decision.

The caller then leaves a voicemail which is handled by and stored in the voicemail storage module 102. In general each user of the system 100 will have their own voicemail storage 102, although in some cases there may be a communal voicemail storage. Optionally, the voicemail is transcribed by the voicemail transcription module 104. The transcription may occur during the voicemail recording or after the recording is complete. The transcription is passed to the transcription analysis module 106 (or else the voicemail transcription module 104 and transcription analysis module 106 are integral), so that further information about the context of the call and/or the caller can be obtained.

At some later time the user, or a different user, wishes to hear voicemails of a certain category or relating to a certain subject. Therefore the server performs a search of the stored voicemail messages based on the associated metadata. This search may be performed by the voicemail metadata storage module 108. A proprietary interface may be provided to allow users to search for and access the voicemails. This interface may show information such as the name and number of the caller who left the voicemail and information about that caller's job or company they work for. The interface may also show all the available information about the context of the voicemail including the general reason for the call, the case or project to which the call related and/or the urgency of the call. The interface may also indicate which user's have permission to access and/or edit certain voicemails, for example whether the voicemail is only accessible to a manager.

Figure 2:
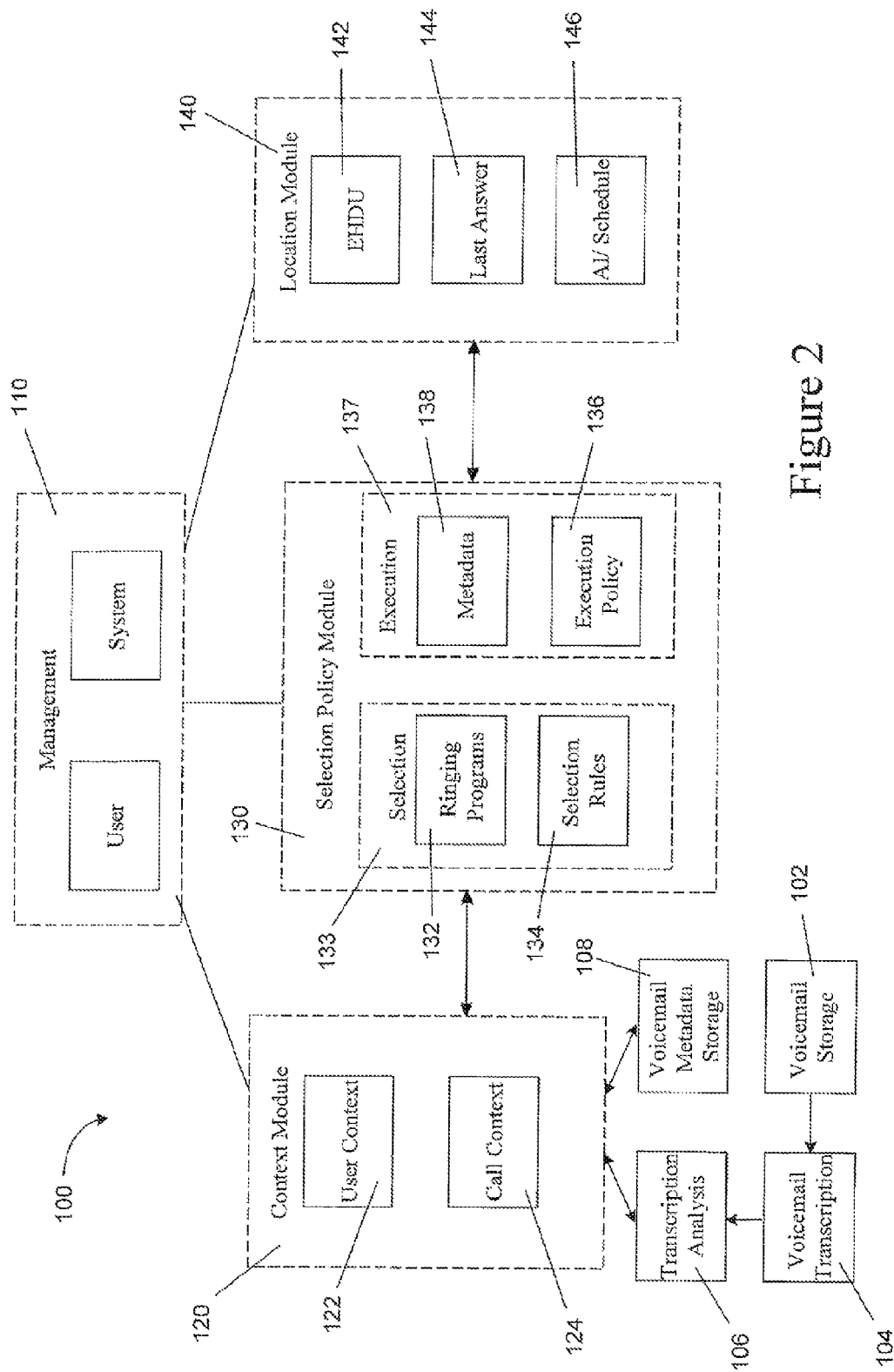
FIG. 2 is a schematic illustration of a further exemplary server suitable for implementing the invention.

FIG. 2 shows a further example embodiment of a server system 100 for categorizing voicemail messages and extracting or determining metadata associated with voicemail messages. In particular, FIG. 2 shows further optional features of the context module 120 as well as additional selection, management and location modules. Unless stated otherwise, those components present in both of FIGS. 1 and 2 function in a similar manner as described with reference to FIG. 1, although some additional functionality is also described below.

The exemplary server system 100 is illustrated in four main blocks, also referred to herein as modules. A management module 110 enables a user or system supervisor to set up and control the system. A context module 120 provides context awareness of both the caller and the user. A location module 140 is used to determine a location of the user at the time a call is received. A selection policy module 130 provides selection policies based on metadata, policy data, and input from the management 110, context 120, and location 140 modules. Each module may run on a different apparatus or device and may be distributed geographically. Alternatively, one or more of the modules may run on the same apparatus or device.

The context module 120 includes a user context module 122 and a call context module 124. The user context module 122 may be in communication with a server, or group of servers that enable contextual information for the user to be obtained in near real time. For example, the user context module 122 may be in communication with a calendar server such as a Microsoft Exchange Server®. By accessing the calendar information in the Microsoft Exchange Server, a location of the called user (i.e. the person to whom the phone call was made) can be determined. The status of this user may also be determined. If the user indicates that he or she is in a meeting, that information can be taken into account. Additional information can also be used, such as whether the user is out of the office, or not available to communicate. If the person is in a meeting, the location of the meeting may be available in the calendar information. For example, a specific conference room may be listed or reserved. The context information can be used to determine how to route the phone call from the caller to the user. Additional details related to the use of context information are provided in U.S. Pat. No. 7,415,104, which is hereby incorporated by reference.

The call context module 124 is configured to obtain identity information for a phone call received at the server 100. For example, the call context module 124 may obtain caller identification information (caller ID), also referred to as call display. The caller ID may be in the single data message format (SDMF) or multi data message format (MDMF). The call context module 124 may also receive automatic number identification information, or another type of information to enable telephone number and/or identification of the caller to be discovered. The call context module 124 contains contact information associated with a business's clients, customers, employees, acquaintances, and other desired associates. The contact information can include background information for the caller, including the person's name, employer, title, phone numbers, email address, and so forth. The identity information can be matched with a specific person's contact information. For example, a phone number obtained at the server 100 from the caller ID can be matched with a contact file and associated with a specific person. Selected background information for the caller can then be used to route his or her phone call as needed.

Using the information obtained by the user context module 122 from the user's calendar and schedule, the user's likely location and co-presence may be determined. For an incoming call, the user context module 122 can provide the information necessary to determine the ability of a user to answer a phone call based on the user's context. The information obtained by the call context module 124 can be used to determine who a call is from. This information can then be linked to an expanded information set. For example, caller ID information sent from the call server to the user context module can identify the phone number of the call as (613) 592-2122. The user context module can determine that this is a call from user Ann Rowe's directory number and that Ann Rowe is the user's boss. This information can be made available to the selection policy module 130. The main purpose of the context information is to allow a user's to be reached and to ensure the call is routed effectively, however it is also useful in later categorizing a voicemail left by the caller when the call is not answered.

Further information regarding determining the context of a call can be found in published US patent application US2009/0248464, which is hereby incorporated by reference in its entirety.

The location module 140 is used to determine the current location of the user. Various techniques may be used. For example, the location of the users external hot desk (EHDU) assignment can be obtained from the EHDU module 142. The location where the user last answered or originated a call may be obtained from the last answer module 144. In addition, the user's schedule can provide an estimate of the user's current location from the schedule module 146. This information may alternatively, or additionally, be obtained from the user context module 122 in the context module 120. The outputs from these modules can be specified in ringing programs by the use of reserved values for location. The values 'ehdu', 'last' and 'schedule' can be used to designate the source from which location data can be obtained. Moreover, the location module 140 can be used to combine all estimates into one that is most likely and supply the estimate as well. The value 'likely' can be used to describe a combined estimate of the user's location. The information from the location module 140 is useful for the second routing decision, if it determined that the call should be routed to the user.

The selection module 130 is configured to make routing decisions about incoming communications. The selection module 130 may make routing decisions in conjunction with the context module 120 by accessing information from the context module. The selection module 130 may also store or have access to information regarding the called user's communication devices (also referred to herein as communication resources or endpoints), such as the location of each device, whether the device is mobile or fixed and what the communication capabilities of each device are.

The selection policy module 130 is divided into two sections, a selection group 133 and an execution group 137. The selection group is comprised of a ringing program module 132 (also referred to herein as a cascaded ringing program module) and a selection rules module 134. The execution group is comprised of a metadata module 138 and an execution policy module 136.

The ringing program module 132 can include one or more cascaded ringing programs. Each cascaded ringing program can include a combination of serial and parallel forking. For instance, a sequence of parallel forks can be initiated in sequence. Each of these forks includes a selection of one or more of the user's plurality of communication devices. Each fork can include an attempt to reach the user in a different way. The different attempts to reach the user may be more or less appropriate to the goal of connecting the user to the phone call, while taking into account the user's current context. The sequence of these forks is designed to deal with the postulated context of the user and other contingencies that may be occurring at the time of the phone call.

Each individual fork within a ringing program can be delimited by a fork element. A fork element is a program that is run to route the phone call to one or more of the user's communication resources. A timeout attribute can be set to provide a maximum amount of time that the ringing program will remain in the fork element. For example, a fork element that includes routing the phone call to the user's desk phone may last for 5 seconds. If the phone call isn't answered within the five second period then the program will move on to the next fork.

The selection rules module 134 contains rules that link the call in context to the most appropriate ringing program. Individual rules may be selected by the user to identify the desired ringing program for various different user contexts. Alternatively, predetermined sets of rules may be selected and applied based on the context of the user. For example, a user may define a rule such as: "for calls from customers while I am in a meeting, use Ringing Program 1; for calls from my boss while I am in a meeting, use Ringing Program 2; for calls from client X always use Ringing Program 3." The rules may be applied to groups of people, such as customers, or to individual people, such client X. This may be most effective for applying a rule to sets of people. Alternatively, a rule for a particular client may be stored with the background information for the particular client, such as in the call context module 124. If no particular rules are selected for a caller, then the generic rules in the selection policy module may be applied.

Where rules have conflicts, a conflict mechanism can be used to select one of the rules for implementation. In some embodiments, each contact stored in the user's contact database may be identified to different levels of specificity. Continuing with the previous example in which the caller was "Ann Rowe", the most specific information is "Ann Rowe" and/or Ann Rowe's number, (613) 592-2122. The next level of specificity is that Ann Rowe is the called user's direct boss. The third level of specificity may be that Ann Rowe is a member of the same organization and/or a management level contact. Further levels of specificity, for example to do with the caller's physical location may also be defined in the contact directory. When a call is received, rules using information of varying degrees of specificity are activated and propose their associated ringing program for execution. If there is a conflict, the conflict resolving mechanism will select the ringing program with the highest specificity rule. This ringing program should most closely match the current user context and thus most closely match the current needs of the user.

If multiple rules have the same priority or specificity, then the most recently used ringing program is used. If this does not select a single rule, then a random rule selection may be made.

The examples are not intended to provide a complete set of rules. Rules can be selected and established based on the needs of the user. Users with unique needs can set up unique rules to select desired ringing programs based on those needs. Further information regarding cascaded ringing programs which can be used in the present invention can be found in granted US patent with publication number US2010/0267374, which is hereby incorporated by reference in its entirety.

The metadata module 138 in the execution module 137 stores information that can be accessed by the ringing program module 132. For instance, the plurality of communication devices associated with a user can be listed in the metadata module. The ringing program module 132 can indicate a selection of devices. Each device's address, such as the device's directory number, URL address, or other type of address can be stored in the metadata module. The metadata module can also include information related to the protocol through which a selected communication device is operated. The metadata module can also include additional variables, such as whether the device is fixed or mobile, local to the business or located remotely, whether the expected operator of the device is human, robot, the user, an assistant, and so forth.

The ability to store information related to the user's communication devices in the metadata module 138 enables ringing programs to be formed that are independent of the user's particular communication resources. This enables ringing programs to be created that can be used by a variety of people. The ability to create generic ringing programs enhances the usefulness of the system. While people generally like to be more productive, they are often hesitant to spend the time necessary to create the individual rules needed to select a proper ringing program. By using the separate metadata, generic ringing programs can be used by people, and then modified to fit their specific needs. In addition, as the user's communication devices change, such as when a new cell phone is purchased or the user moves offices or changes an office phone, the device list and other metadata information can be easily updated without requiring extensive changes to the ringing programs.

The server system 100 of FIG. 2 also comprises the voicemail module 102, voicemail transcription module 104, transcription analysis module 106 and voicemail metadata storage module 108 as described with reference to FIG. 1.

Figure 3:
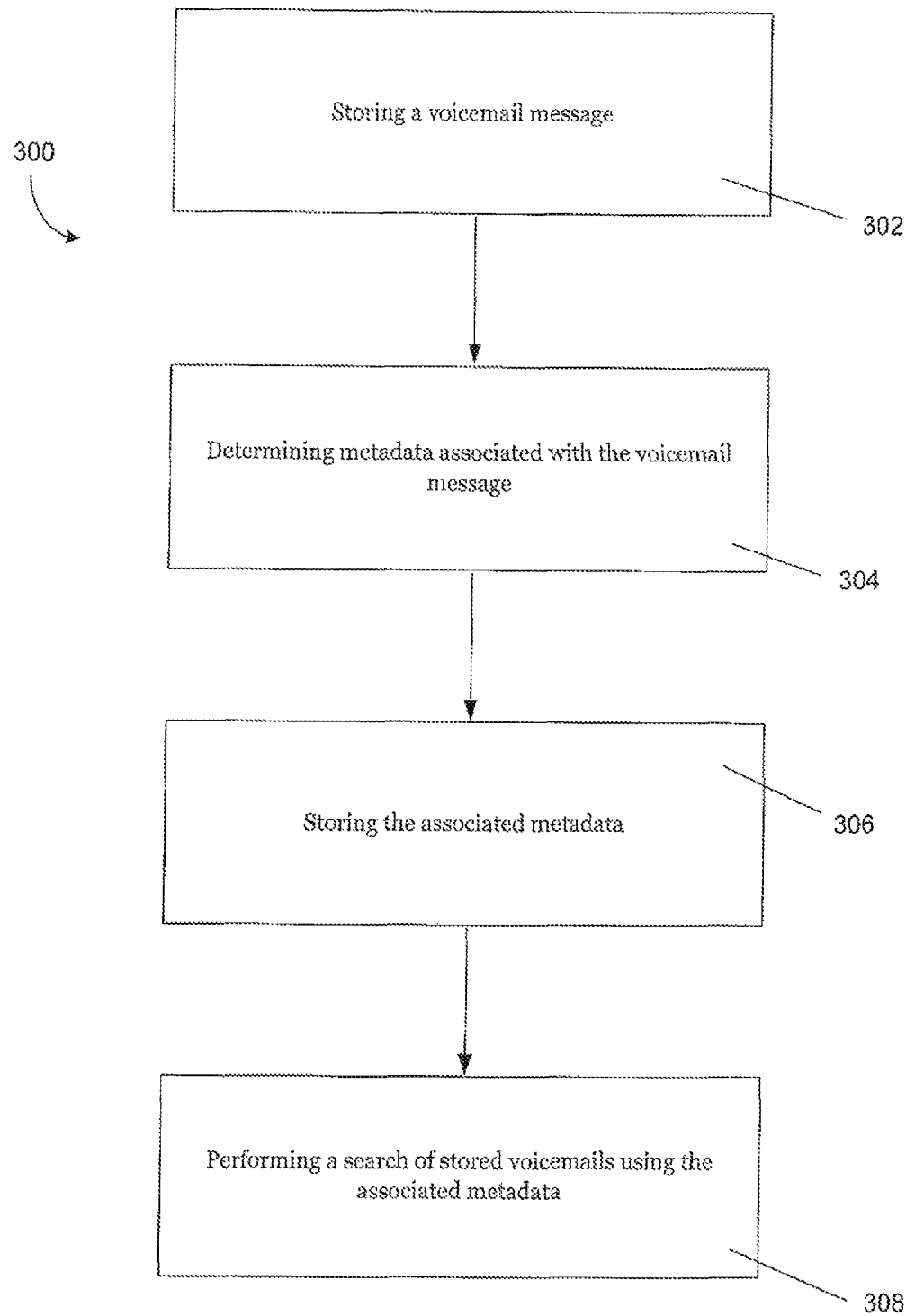
FIG. 3 is a flow chart illustrating exemplary operation of the system.

FIG. 3 is a flow chart illustrating a method 300 of categorizing voicemail messages according to aspects of the invention. The method includes a step 302 of storing a voicemail message. In some embodiments, step 302 may be preceded by a decision to route an incoming call to voicemail and recording the voicemail message. In some other embodiments, step 302 may be preceded by a decision to route the incoming call to the user, but the user does not answer any of their communication devices which are called, resulting in the call be forwarded to the user's voicemail.

Step 304 requires determining metadata associated with the voicemail message. The metadata may be or may be related to information about a context of the incoming call which resulted in the voicemail. The metadata may be generated using information about the caller and/or called user and/or information extracted from the transcription of the voicemail message. The metadata may for example be an importance or urgency level, which may be descriptive (e.g. high importance, very high importance, internal, external etc) or numerical (e.g. 1-8). The metadata may alternatively or in addition indicate an emotional content of the call, for example if the caller appears to be angry. The metadata may alternatively or in addition indicate a reason for the call, for example if it appears that the callers wants to cancel some order or account, requires an update about an order or account, wishes to place a new order or if there is some unresolved issue etc. The metadata may alternatively or in addition indicate one or more collaborative groups which are relevant to the call and/or caller. For example if the call relates to a specific project, or the 'sales' team, 'technical' team etc. The system may be modified by end users to define metadata which is specific to that end user's work environment and business.

Step 306 requires storing the associated metadata. The metadata may be stored in the same memory as the voicemail messages or in a separate memory.

Step 308 of the method requires performing a search of stored voicemails using the associated metadata. The search may use one, or more than one piece of metadata in order to filter the available voicemail messages so that only relevant messages are returned from the search. For example, a user may wish to hear all messages having an associated metadata tag of "urgent". A another example, a colleague of the user who is in the same collaborative group ("Sales group") may have access to the user's voicemail messages and may wish to hear messages having an associated metadata tag of "sales group". As a further example, another user who is a group manager may wish to hear all messages having an associated metadata tag of "angry caller". Some messages may only be accessible to managers.

In order to perform the search the user may be provided with an interface, for example a visual voicemail interface. This interface can be a program hosted by the server system 100 or locally on the user's communication device. The interface may come pre-programmed with a range of generic filters and/or filters tailored for a specific industry or business. In addition, the interface may allow users to create their own filters. The interface may also comprise an audio interface in which a user can select (for example using the keypad) from a list of filters presented aurally. Users may program the interface to alert them whenever a voicemail is received, either by their own voicemail or by a colleague's voicemail, that has certain metadata associated with it. Additionally a manager of a group, a system manager or other personnel may create and manage filters which become part of the filter repertoire of all members of a group. For example, all members of a particular collaborative group may be notified when one of the group receives a voicemail which has associated metadata of "urgent" or of a specific issue of concern such as "delayed shipment" that does not require the specific attention of the called user. As a further example, group managers, specialised trouble shooters, senior managers etc. may be notified whenever a member of their group receives a voicemail which has associated metadata of "angry caller". Thus the voicemail categorization and search system described herein provides an improved and more efficient means for dealing with voicemails and for collaboration within an organisation.

The interface may present the voicemail messages differently depending on their associated metadata. For example, those voicemail messages marked as 'angry caller' or as 'urgent' may be moved to a more prominent position, for example by always appearing first in the search results. These messages may additionally or alternatively have a different font colour e.g. red, to draw the user's attention.

A novel aspect of this disclosure is, as described above, that voicemails although received by the addressed user are not exclusively controlled for access by the addressed user. Members of collaborative groups may be alerted to and be provided with clients (including user interfaces) that allow them to search for voicemails of interest from all members of the group. This capability allows for a degree of interactive co-operation that allows concerns to be shared and addressed by appropriate personnel. However, it does create issues of interpersonal co-ordination. If an urgent voicemail is received and the concern is dealt with by a user other than the addressed one, the addressed user and other users in the group need to be notified of this in order to prevent confusion and wasted effort. To solve this problem, additional metadata is provided to indicate that a voicemail has been heard and by which user. This additional metadata may also indicate the date and time at which the voicemail was accessed and a short description of what actions have been taken in regard to it. These metadata may be displayed in a visual voicemail to allow the called user and other members of the associated collaborative group to understand the current situation. For example, a called user accessing his/her visual voicemail interface may see that a voicemail sent to them has been accessed by another party and resolved at a specific time. Voicemails dealt with in this way by other parties may be given special indications in the visual voicemail interface, such as a different colour of font, a different background etc.

As described above, additional metadata may be provided to allow for effective co-ordination of access to voice mails. Similar issues may be addressed regarding the capability of deleting voicemails. In certain embodiments, only the called user and system management personnel may delete voicemail messages sent to the called user. However in other embodiments, other members of a collaborative group or other personnel with rights to see a specific voicemail may be supplied with the authorisation to delete it. This capability may be supplied to all collaborative groups or may be enabled for certain selected groups.

Similar capabilities as described for deletion may be supplied in certain embodiments for members of collaborative groups to forward, archive, mark as heard, mark as not heard and similar management features for voicemails addressed to another member. Thus, other users (as well as the user who received the voicemail message) may edit the metadata associated with the voicemail message.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. An apparatus for categorizing voicemails, the apparatus comprising a processor arrangement and a non-transitory computer-readable storage medium, the non-transitory computer-readable storage having stored thereon computer-readable code, which, when executed by the processor arrangement, causes the processor arrangement to:
  receive a call for a first user of the apparatus and route the call to a voicemail of the first user;
  in response to receiving the call and routing the call, store a voicemail message intended for the first user of the apparatus;
  create a transcription of the voicemail message;
  determine information about the context of the voicemail message by determining one or more of a subject, an importance level, an urgency level, a project identifier, a case reference, an identification of the caller and information about the caller from the transcription;
  determine metadata associated with the voicemail message, the metadata associated with the voicemail message comprising the information about the context of the voicemail message;
  store the associated metadata;
  perform a search of stored voicemails using the associated metadata; and
  provide an alert to a second user of the apparatus in response to determining that the metadata associated with the voicemail message corresponds to predefined metadata.

2. Apparatus according to claim 1, wherein the computer-readable code, when executed by the processor arrangement, causes the processor arrangement to determine one or more collaborative groups that are relevant to the voicemail message.

3. Apparatus according to claim 2, wherein the computer-readable code, when executed by the processor arrangement, causes the processor arrangement to use one or more of identity information associated with the caller who left the voicemail message and background information associated with the caller who left the voicemail message in order to determine the one or more collaborative groups.

4. Apparatus according to claim 1, wherein the computer-readable code, when executed by the processor arrangement, causes the processor arrangement to use information associated with the user in order to determine the one or more collaborative groups.

5. Apparatus according to claim 1, wherein the computer-readable code, when executed by the processor arrangement, causes the processor arrangement to perform a search of stored voicemails using the associated metadata in response to a search request from the user.

6. Apparatus according to claim 1, wherein the metadata associated with the voicemail message comprises the one or more collaborative groups that are relevant to the voicemail message.

7. Apparatus according to claim 1, wherein the computer-readable code, when executed by the processor arrangement, causes the processor arrangement to create a transcription of the voicemail message by applying a speech analysis process to the voicemail message as the voicemail message is being recorded.

8. Apparatus according to claim 1, wherein the computer-readable code, when executed by the processor arrangement, causes the processor arrangement to compare the transcription of the voicemail to a stored list of words and/or phrases in order to determine information about the context of the voicemail message from the transcription.

9. Apparatus according to claim 1, wherein the computer-readable code, when executed by the processor arrangement, causes the processor arrangement to provide a visual interface for receiving search requests and for displaying results of search requests.

10. Apparatus according to claim 1, wherein the computer-readable code, when executed by the processor arrangement, causes the processor arrangement to provide an audio interface for accessing voicemail messages and for receiving search requests.

11. Apparatus according to claim 1, wherein the metadata associated with the voicemail message comprises one or more of information indicating that the voicemail message has been accessed, which user accessed the voicemail message, when the voicemail message was accessed and what actions have been taken in regard of the voicemail message.

12. Apparatus according to claim 1, wherein the computer-readable code, when executed by the processor arrangement, causes the processor arrangement to allow a user other than the user who received the voicemail message to edit, move, forward and/or delete the voicemail message and/or to edit the metadata associated with the voicemail message.

13. Apparatus according to claim 1, wherein the computer-readable code, when executed by the processor arrangement, causes the processor arrangement to perform a search of stored voicemails using the associated metadata in response to a search request from another user.

14. Apparatus according to claim 1, wherein the computer-readable code, when executed by the processor arrangement, causes the processor arrangement to perform a search of stored voicemails using the associated metadata in response to an automatically generated search request.

15. A computer-implemented method for categorizing voicemails, the method comprising:
receiving a call for a first user of an apparatus for categorizing voicemails and routing the call to a voicemail of the first user;
in response to receiving the call and routing the call, storing a voicemail message intended for the first user;
creating a transcription of the voicemail message;
determining information about the context of the voicemail message by determining one or more of a subject, an importance level, an urgency level, a project identifier, a case reference, an identification of the caller and information about the caller from the transcription;
determining metadata associated with the voicemail message, the metadata associated with the voicemail message comprising the information about the context of the voicemail message;
storing the associated metadata;
performing a search of stored voicemails using the associated metadata; and
providing an alert to a second user of the apparatus for categorizing voicemails in response to determining that the metadata associated with the voicemail message corresponds to predefined metadata.

16. A non-transitory computer-readable storage medium having stored thereon computer-readable code, which, when executed by computing apparatus, causes the computing apparatus to:
receive a call for a first user of the computing apparatus and route the call to a voicemail of the first user;
in response to receiving the call and routing the call, store a voicemail message intended for the first user of the computing apparatus;
create a transcription of the voicemail message;
determine information about the context of the voicemail message by determining one or more of a subject, an importance level, an urgency level, a project identifier, a case reference, an identification of the caller and information about the caller from the transcription;
determine metadata associated with the voicemail message, the metadata associated with the voicemail message comprising the information about the context of the voicemail message;
store the associated metadata;
perform a search of stored voicemails using the associated metadata; and
providing an alert to a second user of the apparatus for categorizing voicemails in response to determining that the metadata associated with the voicemail message corresponds to predefined metadata.

* * * * *